United States Patent
Düwel et al.

[11] 3,888,978
[45] June 10, 1975

[54] CERTAIN PHOSPHORUS ACID ESTERS AS DISINFECTANTS

[75] Inventors: Dieter Düwel, Hofheim, Taunus; Helmut Diery, Kelkheim, Taunus; Ulrich Cuntze, Hofheim, Taunus, all of Germany

[73] Assignee: Hoechst Aktiengesellschaft, Frankfurt am Main, Germany

[22] Filed: Aug. 9, 1973

[21] Appl. No.: 386,858

[30] Foreign Application Priority Data
Aug. 12, 1972 Germany............................ 2239790
Apr. 14, 1973 Germany............................ 2319046

[52] U.S. Cl. ................. 424/199; 424/211; 260/924
[51] Int. Cl.............................................. A01n 9/36
[58] Field of Search ............ 424/199, 211; 260/924

[56] References Cited
UNITED STATES PATENTS
3,490,743  1/1970  Schmitz et al. ..................... 424/211

Primary Examiner—V. D. Turner
Attorney, Agent, or Firm—Curtis, Morris & Safford

[57] ABSTRACT

A disinfectant is provided which contains as active ingredient a compound of the formula I

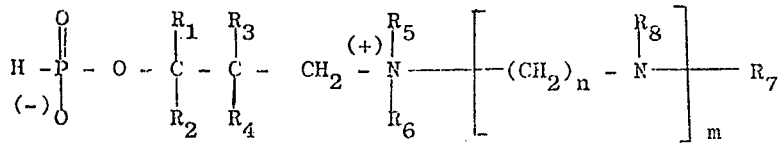

in which $R_1$ and $R_2$ each represents hydrogen or methyl, $R_3$, $R_4$, $R_5$, $R_6$ and $R_8$ each represents hydrogen or an alklyl radical having from 1 to 4 carbon atoms, $R_7$ represents an alykl or alkenyl radical having from 8 to 18 carbon atoms, $n$ stands for 2 or 3, $m$ is zero or a number from 1 to 4, in the case of $m$ being 1 to 4, $R_2$ represents hydrogen and, in the case of $m$ being zero, $R_3$ $R_4$ must be hydrogen if $R_1$ and $R_2$ are methyl and $R_4$ must be hydrogen if $R_3$ represents propyl or butyl.

The disinfectant is effective against bacteria and stages of helminths.

11 Claims, No Drawings

CERTAIN PHOSPHORUS ACID ESTERS AS DISINFECTANTS

The present invention relates to a disinfectant which is effective against most different bacteria, as well as against stages of helminths, especially eelworm eggs.

A great number of disinfecting substances is known which are used in the most different fields of application, for example acids and lyes, chlorine or formaldehyde separating agents, cresol, lysol, and organo-metal compounds. The said disinfectants have various drawbacks, such as corrosive action on many materials, toxicity, allergenic action, or unpleasant odor.

The present invention provides a disinfectant characterized by a rapid and complete disinfecting action without having the aforesaid disadvantages.

The object of the present invention is, therefore, a disinfectant containing as active ingredient a compound of the formula I $$H-\overset{O}{\underset{(-)O}{\overset{\|}{P}}}-O-\overset{R_1}{\underset{R_2}{\overset{|}{C}}}-\overset{R_3}{\underset{R_4}{\overset{|}{C}}}-CH_2-\overset{(+)}{\underset{R_6}{\overset{R_5}{N}}}-\left[-(CH_2)_n-\overset{R_8}{\underset{}{N}}-\right]_m-R_7 \quad I$$

in which $R_1$ and $R_2$ each represents hydrogen or methyl, $R_3$, $R_4$, $R_5$, $R_6$ and $R_8$ each represents hydrogen or an alkyl radical having from 1 to 4 carbon atoms, $R_7$ represents an alkyl or alkenyl radical having from 8 to 18 carbon atoms, $n$ stands for 2 or 3, $m$ is an integer from 0 to 4, when $m$ being 1 to 4, $R_2$ represents hydrogen and, when $m$ is zero, $R_3$ and $R_4$ must be hydrogen if $R_1$ and $R_2$ are methyl, and $R_4$ must be hydrogen if $R_3$ represents propyl or butyl.

The compounds of formula I have a high killing effect on different pathogenic germs even in low concentration and after a short time of action. The preparations of compounds of formula I, preferably their aqueous solutions have a pronounced killing effect on worm eggs and in this respect they are superior to known disinfectants.

The compounds of formula I are prepared by reacting a cyclic phosphite of the formula II $$H-P\underset{O-CH_2}{\overset{O-C{\overset{R_1}{\underset{}{}}}{\overset{R_2}{\underset{}{}}}}{\diagup\diagdown}}C{\overset{R_3}{\underset{R_4}{}}}$$

with an amine of the formula III $$\overset{R_5}{\underset{R_6}{N}}-\left[-(CH_2)_n-\overset{R_8}{\underset{}{N}}-\right]_m-R_7 \quad III$$

in which the substituents $R_1$ to $R_8$ and $m$ have the above meaning. The reaction components are expediently reacted in a proportion of about 1 mole of amine to 1 mole of phosphite. In some cases it may also be suitable to use one component, preferably the amine, in a slight excess. The reaction is preferably performed at a temperature in the range of from 60° to 150°C. Depending on the boiling or melting temperature of the amine used, the reaction can be effected in the melt or with the use of a suitable polar solvent, such as, for example, water or an alcohol. The reaction products are directly obtained in a high purity, so that generally a further purification may be dispensed with. When the reaction is carried out in the presence of a solvent, it is only necessary to remove the latter by distillation.

The following examples illustrate the invention.

EXAMPLES OF PREPARATION 1. 3-(3-Coconut alkylaminopropyl-ammonium)-2,2-dimethylpropyl-phosphorous acid ester.

15.0 g (0.1 mole) of 2-oxo-(2H)-5,5-dimethyl-1,3-dioxa-2-phosphorinane and 27.4 g (0.1 mole) of coconut alkyl-propylene diamine in 100 cc of water were refluxed for 2 hours while stirring. The solution was evaporated to dryness and 40 grams of a compound of the following formula were obtained $$H-\overset{O}{\underset{O(-)}{\overset{\|}{P}}}-O-CH_2-\overset{CH_3}{\underset{CH_3}{\overset{|}{C}}}-CH_2-\overset{H}{\underset{H}{\overset{(+)}{N}}}-(CH_2)_3-NH-R$$

in which R represents an alkyl radical with the chain distribution of coconut oil fatty acid.

| Equivalent weight | calculated 424, | found 436 |
|---|---|---|
| Nitrogen | calculated 6.6%, | found 6.4 %. |

2. 3-Dodecylammonium-2,2-dimethylpropyl-phosphorous acid ester.

30.0 g (0.2 mole) of 2-oxo-(2H)-5,5-dimethyl-1,3-dioxa-2-phosphorinane and 44.4 g (0.2 mole) of dodecyl amine in 100 cc of water were refluxed for 2 hours while stirring. The solution was evaporated to dryness. 73.0 g of the compound of the following formula were obtained $$H-\overset{O}{\underset{O(-)}{\overset{\|}{P}}}-O-CH_2-\overset{CH_3}{\underset{CH_3}{\overset{|}{C}}}-CH_2-\overset{H}{\underset{H}{\overset{(+)}{N}}}C_{12}H_{25}$$

| Equivalent weight | calculated 387, | found 383 |
|---|---|---|
| Nitrogen | calculated 3.6 %, | found 3.5 % |
| Phosphorus | calculated 8.0 %, | found 7.8 %. |

In analogous manner the following compounds were prepared:

3. 3-[2-(2-Dodecylamino-ethyl)-aminoethyl-ammonium]-2,2-dimethylpropyl-phosphorous acid ester of the formula

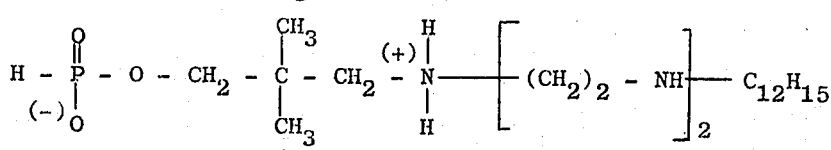

| Equivalent weight | calculated 421, | found 440 |
| Nitrogen | calculated 10.0 %, | found 9.7 %. |

4. 3-(3-Coconutalkylaminopropyl-ammonium)-propyl-phosphorous acid ester of the following formula

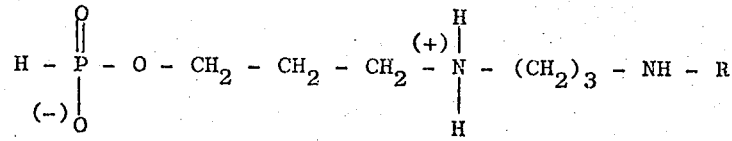

in which R represents the alkyl radical having the chain distribution of coconut oil fatty acid.

| Equivalent weight | calculated 396, | found 400 |
| Nitrogen | calculated 7.1 %, | found 6.9 %. |

5. 3-Coconut alkyl-ammonium-2,2-dimethylpropyl-phosphorous acid ester of the following formula

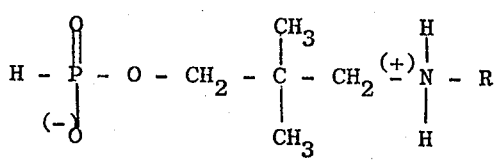

in which R represents an alkyl radical having the chain distribution of coconut oil fatty acid.

| Equivalent weight | calculated 365, | found 380 |
| Nitrogen | calculated 3.8 % | found 3.8 %. |

6. 3-Dodecylammonium-propyl-phosphorous acid ester of the formula

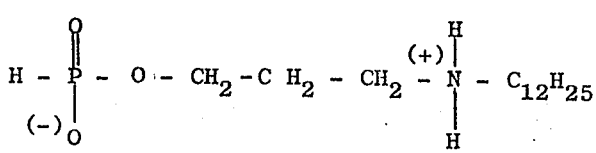

| Equivalent weight | calculated 309, | found 331 |
| Nitrogen | calculated 4.5 %, | found 4.4 % |

7. 3-Octylammonium-2,2-dimethylpropyl-phosphorous acid ester of the formula

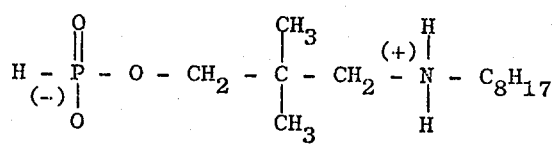

| Equivalent weight | calculated 287, | found 307 |
| Nitrogen | calculated 4.9 %, | found 4.7 %. |

8. 3-Octadecylammonium-2,2-dimethylpropyl-phosphorous acid ester of the formula

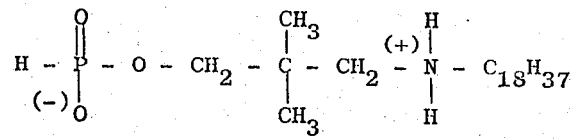

| Equivalent weight | calculated 406, | found 386 |
| Nitrogen | calculated 3.4 %, | found 3.3 %. |

9. 3-Octadecenylammonium-2,2-dimethylpropyl-phosphorous acid ester of the formula

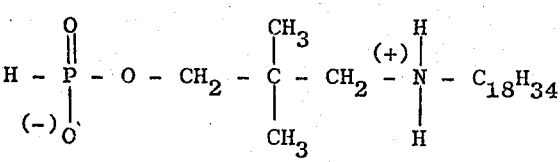

| Equivalent weight | calculated 410, | found 451 |
| Nitrogen | calculated 3.4 %, | found 3.2 %. |

10. 3-(Dimethyldodecyl-ammonium)-propyl-phosphorous acid ester of the formula

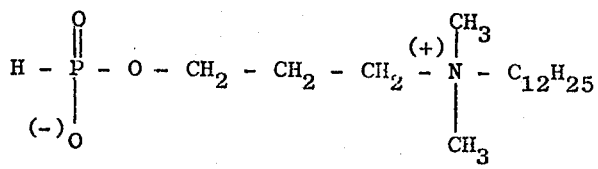

| Equivalent weight | calculated 359, | found 345 |
| Nitrogen | calculated 3.9 %, | found 3.9 %. |

11. 3-(Dodecylmethyl-ammonium)-2,2-dimethylpropyl-phosphorous acid ester of the following formula

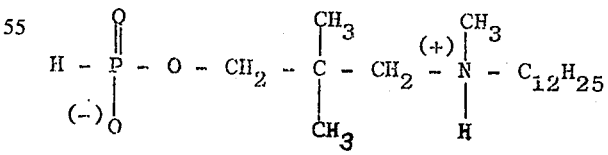

| Equivalent weight | calculated 344, | found 362 |
| Nitrogen | calculated 4.1 %, | found 3.9 %. |

12. 3-(Dodecyl-diethyl-ammonium)-1-methyl-propyl-phosphorous acid ester.

13. 3-(Decyl-butyl-ammonium)-2,2-diethyl-propyl-phosphorous acid ester.

14. 3-Octadecyl-ammonium-2-butyl-propyl-phosphorous acid ester.

15. 3-Dodecyl-ammonium-1,1-dimethyl-propyl-phosphorous acid ester.

16. 3-(Oleyl-butyl-ammonium)-2-butyl-propyl-phosphorous acid ester.

17. 3-Decyl-ammonium-2,2-diethyl-propyl-phosphorous acid ester.

18. 3-(Octadecyl-ethyl-ammonium)-2ethyl-propyl-phosphorous acid ester.

19. 3-[2-(2-Octylaminoethyl)-aminoethyl-ammonium]-2-methyl-2-propyl-propyl-phosphorous acid ester.

20. 3-(3-Coconut alkylmethyl-aminopropyl-ammonium)-2-butyl-2-ethyl-propyl-phosphorous acid ester.

21. 3-[3-(3-Coconut alkylaminopropyl)-aminopropyl-ammonium]-1-methyl-propyl-phosphorous acid ester.

The antibacterial activity of the compounds of formula I was examined in a series dilution test in analogy to the prescriptions of "Deutsche Gesellschaft fuer Hygiene und Mikrobiologie." As comparative substance a commercial amphoteric compound of the formula

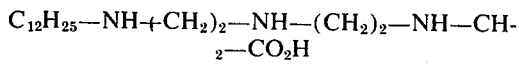

$$C_{12}H_{25}-NH+CH_2)_2-NH-(CH_2)_2-NH-CH_2-CO_2H$$

was used.

The substances to be tested were diluted in geometrically descending series (factor 2) with Merck-I bouillon and inoculated with 2 drops each of a bacteria culture 24 hours old and diluted in a ratio of 1 to 100. The results were ascertained after an incubation period of 18 hours at 37°C. The minimum inhibitive concentration is the minimum concentration (unit by weight per milliliter of test solution) found in the series dilution test, of an antibacterially active substance at which a growth of the tested organisms could no longer be observed. The tests were carried out with the compounds of Examples 1, 3, and 4. The results of the tests are summarized in Tables I and II.

Table I

| type of germ | Minimum inhibitive concentration (unit by weight/ml) | | | |
|---|---|---|---|---|
| | compound 1 | | comparative product | |
| Salm.paratyphi A | 3.9 | γ | 15.6 | γ |
| typhi murium | 15.6 | γ | 31.5 | γ |
| oranienburg | 15.6 | γ | 31.5 | γ |
| typhi | 7.8 | γ | 31.5 | γ |
| give | 7.8 | γ | 15.6 | γ |
| Shigella flexneri | 7.8 | γ | 15.6 | γ |
| E. coli 026 | 15.6 | γ | 31.5 | γ |
| 055 | 3.9 | γ | 15.6 | γ |
| 078 | 3.9 | γ | 7.8 | γ |
| 086 | 1.25 | γ | 15.6 | γ |
| 0114 | 3.9 | γ | 15.6 | γ |
| 0126 | 7.8 | γ | 15.6 | γ |
| Aerobacter cloacae | 3.9 | γ | 15.6 | γ |
| aerogenes | 15.6 | γ | 31.5 | γ |
| Paracolob. Hafnia | 15.6 | γ | 31.5 | γ |
| Bethesda-Ballerup | 7.8 | γ | 31.5 | γ |
| Providencia | 31.5 | γ | 125 | γ |
| Kelbs pneumoniae | 6.25 | γ | 7.8 | γ |
| Prot. mirabilis | 625 | γ | 1.25 | mg |
| 60/3 | 625 | γ | 2.5 | γ |
| 112/3 | 1.25 | mg | 1.25 | γ |
| 166/3 | 625 | γ | 1.25 | γ |
| 174/3 | 156 | γ | 1.25 | mg |
| Pseud. aeruginosa | 15.6 | γ | 31.5 | γ |
| 77/2 | 15.6 | γ | 62.5 | γ |
| 110/2 | 15.6 | γ | 62.5 | γ |
| 880/2 | 15.6 | γ | 62.5 | γ |
| 2467/2 | 15.6 | γ | 62.5 | γ |
| 2520/2 | 15.6 | γ | 62.5 | γ |

Table II

| type of germ | Minimum inhibitive concentration (unit by weight/ml) | | | | | |
|---|---|---|---|---|---|---|
| | compound 3 | | compound 4 | | comparative product | |
| Salm.paratyphi A | 6.25 | γ | 12.5 | γ | 3.1 | γ |
| typhi murium | 12.5 | γ | 12.5 | γ | 12.5 | γ |
| oranienburg | 25 | γ | 6.25 | γ | 25 | γ |
| typhi | 12.5 | γ | 6.25 | γ | 12.5 | γ |
| orion | 12.5 | γ | 6.25 | γ | 6.25 | γ |
| give | 12.5 | γ | 6.25 | γ | 25 | γ |
| Shigella flexneri | 6.25 | γ | 6.25 | γ | 12.5 | γ |
| E. coli 026 | 6.25 | γ | 6.25 | γ | 12.5 | γ |
| 055 | 6.25 | γ | 6.25 | γ | 25 | γ |
| 078 | 6.25 | γ | 12.5 | γ | 25 | γ |
| 086 | 12.5 | γ | 12.5 | γ | 25 | γ |
| 0114 | 6.25 | γ | 12.5 | γ | 25 | γ |
| 0126 | 6.25 | γ | 12.5 | γ | 25 | γ |
| Aerobacter cloacae | 6.25 | γ | 6.25 | γ | 25 | γ |
| aerogenes | 12.5 | γ | 25 | γ | 50 | γ |
| Paracolob. Hafnia | 12.5 | γ | 12.5 | γ | 25 | γ |
| Bethesda-Ballerup | 12.5 | γ | 6.25 | γ | 12.5 | γ |
| Providencia | 3.1 | γ | 12.5 | γ | 50 | γ |
| Klebs pneumoniae | 3.1 | γ | 6.25 | γ | 12.5 | γ |
| Prot. mirabilis | 500 | γ | 250 | γ | 1 | mg |
| 60/3 | 250 | γ | 250 | γ | 1 | mg |
| 112/3 | 250 | γ | 250 | γ | 1 | mg |
| 166/3 | 250 | γ | 250 | γ | 1 | mg |
| 174/3 | 250 | γ | 125 | γ | 1 | mg |
| Pseud. aeruginosa | 12.5 | γ | 6.25 | γ | 50 | γ |
| 77/2 | 25 | γ | 12.5 | γ | 50 | γ |
| 110/2 | 12.5 | γ | 12.5 | γ | 50 | γ |
| 880/2 | 12.5 | γ | 12.5 | γ | 50 | γ |
| 2467/2 | 25 | γ | 12.5 | γ | 50 | γ |
| 2520/2 | 25 | γ | 25 | γ | 50 | γ |

As the tests of Table I and Table II were carried out under different conditions, it is not possible directly to compare the results of Table I with those of Table II. It can be seen that a smaller amount of the compounds of formula I is sufficient to obtain a growth inhibition than of the comparative product.

The killing effect on worm eggs of the compounds of formula I was determined according to the following method:

Eggs of a female eelworm were collected and subjected to the action of the test substances for the periods of time and at the concentrations as indicated in the following Table III. The preparations were then washed five times with water with decantation and the eggs were incubated for 4 weeks at 37°C. After termination of embryogenesis the number of mobile (developed) embryos was ascertained in comparison to the untreated eelworm eggs and the infectivity of the eggs treated by the test substances was tested on mice. To this effect each time 10,000 of treated eggs were orally administered to mice. 5 Days after administration the mice were killed and lung and liver of the dissected mice were examined as to the presence of ascarides larvae.

A 100 percent disinfection effect was obtained when the embryogenesis was reduced by 100 percent, no mobility of the embryos did exist and no ascarides larvae could be found in the mouse.

In the following Table III the disinfecting activity of the compounds 1, and 3 to 11 of formula I specified in the examples of preparation is shown in comparison to the relevant commercial product Dekaseptol.

Table III

| compound | time (min) | concentration applied | killing rate |
|---|---|---|---|
| 1 | 5 | 1.5 % | 100 % |
| 3 | 5 | 1.5 % | 100 % |
| 4 | 5 | 1.5 % | 100 % |
| 2 | 5 | 1 % | 100 % |
| 5 | 5 | 1 % | 100 % |
| 6 | 5 | 10 % | 80 % |
| 7 | 5 | 10 % | 80 % |
| 8 | .5 | 6 % | 90 % |
| 9 | 5 | 1 % | 100 % |
| 10 | 5 | 6 % | 100 % |
| 11 | 5 | 10 % | 80 % |
| Dekaseptol$^{(R)}$ | 5 | 10 % | 20 % |
|  | 30 | 6 % | 70 % |

The compounds of formula I can be used either per se or in the form of a solution in a solvent miscible with water, preferably in the form of a solution in water, to disinfect rooms and objects, especially for houses, stables and sties, and yards and runs for animals. A disinfectant according to the invention contains 20 to 90 percent by weight, preferably 40 to 70 percent by weight of a compound of formula I as active ingredient dissolved in water.

For application, the disinfectant is generally diluted with water to a content of active ingredient in the range of from 0.5 to 10 percent by weight.

What is claimed is:

1. A disinfectant composition comprising a disinfectant amount of an active compound of the formula

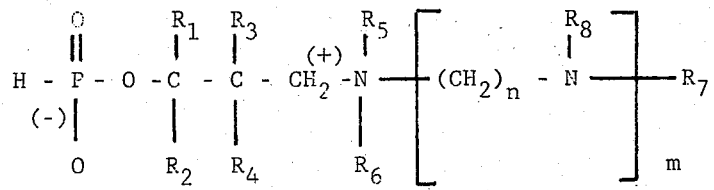

in which $R_1$ and $R_2$ each represents hydrogen or methyl, $R_3$, $R_4$, $R_5$, $R_6$ and $R_8$ each represents hydrogen or alkyl of from 1 to 4 carbon atoms, $R_7$ represents alkyl or alkenyl of from 8 to 18 carbon atoms, $n$ stands for 2 or 3, $m$ is an integer from zero to 4, $R_2$ being hydrogen when $m$ is 1 to 4, $R_3$ and $R_4$ being hydrogen when $m$ is zero and $R_1$ and $R_2$ are methyl, and $R_4$ being hydrogen when $m$ is zero and $R_3$ is propyl or butyl, said active compound being present in an amount of from 20 to 90 percent by weight, the balance being water.

2. The disinfectant composition as defined in claim 1, wherein the active compound is present in an amount of from 40 to 70 percent by weight.

3. The disinfectant composition as claimed in claim 1, wherein the active ingredient is 3-(3-coconutalkylaminopropyl-ammonium)-2,2-dimethylpropyl-phosphorous acid ester.

4. The disinfectant composition as claimed in claim 1, wherein the active ingredient is 3-[2-(2-dodecylaminoethyl)-aminoethyl-ammonium]-2,2-dimethyl-propyl-phosphorous acid ester.

5. The disinfectant composition as claimed in claim 1, wherein the active ingredient is 3-(3-coconutalkylaminopropyl-ammonium)-propylphosphorous acid ester.

6. The disinfectant composition as claimed in claim 1, wherein the active ingredient is 3-dodecyl-ammonium-2,2-dimethylpropyl-phosphorous acid ester.

7. The disinfectant composition as claimed in claim 1, wherein the active ingredient is 3-coconutalkyl-ammonium-2,2-dimethylpropylphosphorous acid ester.

8. The disinfectant composition as claimed in claim 1, wherein the active ingredient is 3-octadecenyl-ammonium-2,2-dimethylpropylphosphorous acid ester.

9. The disinfectant composition as claimed in claim 1, wherein the active ingredient is 3-(dimethyl-dodecyl-ammonium)-propyl-phosphorous acid ester.

10. A method of disinfecting a room, yard or animal run which comprises applying a disinfectant amount of the active compound defined in claim 1 to the room, yard or animal run to be disinfected.

11. The method defined in claim 10 wherein the active compound is diluted with water to a concentration of 0.5 to 10 percent by weight.

* * * * *